United States Patent [19]

Markert et al.

[11] Patent Number: 4,564,651

[45] Date of Patent: Jan. 14, 1986

[54] METHOD FOR THE MANUFACTURE OF REACTION RESIN MOLDING MATERIALS

[75] Inventors: Helmut Markert, Nuremburg; Wolfgang Rogler; Klaus Kretzschman, both of Erlangen; Klaus-Robert Hauschildt, Nuremburg, all of Fed. Rep. of Germany

[73] Assignee: Siemens Aktiengesellschaft, Berlin and Munich, Fed. Rep. of Germany

[21] Appl. No.: 624,972

[22] Filed: Jun. 27, 1984

[30] Foreign Application Priority Data

Jun. 27, 1983 [DE] Fed. Rep. of Germany ....... 3323122

[51] Int. Cl.[4] .................. C08K 3/36; C08G 18/58; C08G 18/18; C08G 71/02
[52] U.S. Cl. ..................... 524/589; 524/402; 524/425; 524/430; 525/119; 525/502; 525/452; 528/73; 528/48; 528/52; 528/54; 528/55; 528/57; 428/422.8; 427/116
[58] Field of Search ............. 528/73, 52, 54, 48, 528/55, 57; 524/402, 425, 430, 589; 525/452, 502, 119

[56] References Cited

U.S. PATENT DOCUMENTS

| | | | |
|---|---|---|---|
| 3,979,365 | 9/1976 | Tanaka et al. | 525/452 |
| 4,128,531 | 12/1978 | Toyoda et al. | 525/502 |
| 4,130,546 | 12/1978 | Goto et al. | 525/119 |
| 4,220,731 | 9/1980 | Zuppinger | 528/73 |
| 4,384,101 | 5/1983 | Kovacs et al. | 528/52 |

FOREIGN PATENT DOCUMENTS

| | | |
|---|---|---|
| 1115922 | 10/1961 | Fed. Rep. of Germany. |
| 1963900 | 6/1971 | Fed. Rep. of Germany. |
| 2444458 | 4/1975 | Fed. Rep. of Germany. |
| 2655367 | 4/1978 | Fed. Rep. of Germany. |

*Primary Examiner*—Herbert S. Cockeram
*Attorney, Agent, or Firm*—Kenyon & Kenyon

[57] ABSTRACT

This invention provides reaction resin molded materials (OX/ICR molded materials) containing oxazolidinone and isocyanurate rings prepared from reaction resin mixtures of polyepoxides and polyisocyanates (EP/IC resins) in the presence of a hardening catalyst and has as an object to provide a simple manufacturing method for heat resistant OX/ICR molded materials with improved mechanical properties. According to this invention, EP/IC resins which are capable of casting and impregnating and which are free from solvents are provided. These resins have a formula mole ratio of EP:IC of about 1 to 5 and a viscosity of up to 7,000 mPa sec at 25° C. and are cross-linked by means of tertiary amine or imidazole hardening catalysts at gelling temperatures of up to 130° C. and post-hardening temperatures of 130° to 200° C. to produce OX/ICR molded materials with a mole ratio OX:ICR greater than 1, wherein the reaction of the epoxy and isocyanate groups is above 90% after the hardening.

15 Claims, No Drawings

METHOD FOR THE MANUFACTURE OF REACTION RESIN MOLDING MATERIALS

The present invention relates to a method for the manufacture of reaction resin molded materials (OX/ICR molded materials), containing oxazolidinone and isocyanurate rings, from reaction resin mixtures of polyepoxides and polyisocyanates (EP/IC resins) in the presence of a hardening catalyst, and also relates to the use of such OX/ICR molded materials.

BACKGROUND OF THE INVENTION

The electrotechnical industry predominantly employs acid anhydride or amine cross-linked epoxy resins without solvents as mechanically-thermally high-quality reaction resin molded materials. However, the thermal and mechanical properties required of those reaction resin molded materials has become more and more stringent because the temperature range in which the molded materials are used has been expanded more and more toward high, as well as, low stress temperatures. It is difficult to increase the dimensional heat resistance of the molded materials and maintain high mechanical strength and temperature cycle resistance with epoxy resins cross-linked with acid anhydrides. Increasing the dimensional heat resistance of molded materials can be achieved by increasing the cross-link density, which increases the glass transition temperature. However, this approach significantly degrades the mechanical properties of the molded materials.

It is known that cross-linking EP/IC resins results in OX/ICR molded materials having a high dimensional heat resistance (DE-AS 1 115 922: Col. 5, lines 9 to 14, and DE-AS 1 963 900: Col. 1, lines 4 to 13 and 48 to 60).

U.S. Pat. No. 4,070,416 describes processes for manufacturing OX/ICR molded materials involving EP/IC resins which have a formula mole ratio EP:IC smaller than 1; these EP/IC resins are gelled by means of suitable reaction accelerators, i.e., hardening catalysts, at temperatures of 70° to 130° C. and then post-hardened at temperatures up to more than 200° C. It is also pointed out there that, for the manufacture of OX/ICR molded materials with high glass transition temperatures and at the same time good mechanical properties, the most advantageous formula mole ratio EP:IC is in the range of 0.2 to 0.7.

Investigations of our own, while confirming the high dimensional heat resistance of OX/ICR molded materials produced by the above-mentioned process, clearly show that the mechanical properties of these molded materials are not adequate for many applications, for instance, for the manufacture of insulations with larger insulation wall thicknesses or for the encapsulation of electrical or electronic components which are subjected to high temperature cycle stresses. If, for instance, EP/IC resins (bisphenol-A-diglycidyl ether, diphenylmethane diisocyanate and 66% quartz powder) with a formula mole ratio EP:IC between 0.2 to 0.7 are cross-linked with tertiary amines or imidazoles as reaction accelerators, according to the cross-linking conditions given, extremely brittle OX/ICR molded materials are obtained, the mechanical properties of which get increasingly worse with increasing concentration of diphenylmethane diisocyanate in the EP/IC resin.

It is therefore understandable that it has already been proposed to improve the mechanical properties of OX/ICR molded materials by incorporating flexibilizing or elastifying components. U.S. Pat. No. 3,979,365 suggests prepolymeric oxazolidinones with terminal epoxy groups as polyepoxy components for modifying EP/IC resins. These oxazolidinone prepolymers are prepared by reaction of polyisocyanates with an excess of a polyepoxy component. However, the viscosity of the prepolymers is so high that they are difficult to use without solvents. U.S. Pat. No. 4,100,118 suggests using polyglycidyl esters of dimerized fatty acids mixed with polyepoxides in EP/IC resins. While these polyglycidyl esters have low viscosity, they exhibit a poor mixing behavior in the EP/IC resins. It has also been proposed, to add copolymers of butadiene and acrylonitrile to the EP/IC resins as elastifying agents in U.S. Pat. Nos. 4,128,531 and 4,130,546. These copolymers have functional groups such as hydroxyl and carboxyl groups, whereby the carboxyl groups can be reacted with polyepoxides. Due to their high viscosity, these copolymers, especially in the case of filler-containing EP/IC resins, are hardly usable and are difficult to process because they exhibit a strong tendency toward segregating from the EP/IC resin.

It is an object of the invention to provide a method which, permits the simple manufacture of heat-resistant OX/ICR molded material, i.e., reaction resin molded materials containing oxazolidinone and isocyanurate rings starting with reaction resin mixtures of polyepoxides and polyisocyanates, i.e. EP/IC resins, to produce molded materials with good mechanical properties. The method does not require flexibilizing or elastifying additives and provides readily processable reaction resin mixtures.

SUMMARY OF INVENTION

According to the present invention, the above objects are achieved by the provision of a castable and impregnable EP/IC resin, which is free from solvents, with a formula mole ratio of the epoxy and isocyanate groups (EP:IC) of about 1:1 to 5:1 and a viscosity of up to 7,000 mPa sec at 25° C.; cross-linked by means of tertiary amine or imidazole catalysts; at gelling temperatures of up to about 130° C. and post-hardening temperatures of about 130° to 200° C., the cross-linked molded material having a mole ratio of the oxazolidinone and isocyanurate rings (OX:ICR) larger than 1, and the reaction of the epoxy and isocyanate groups being more than 90% after hardening.

DETAILED DESCRIPTION OF THE INVENTION

It is believed that improvements in the mechanical properties of these molded materials can be explained by the fact that a higher content of oxazolidinone and polyoxazolidinone structures are built into the polymer lattice; than in EP/IC resins having a formula mole ratio EP:IC smaller than 1. The isocyanurate structures bring about a lattice with narrow meshes causing a stiffening of the polymer chain so that they primarily influence the glass transition temperature of the molded materials produced therefrom. In contrast thereto, the oxazolidinone structures widen the lattice leading to greater mobility of the polymer chain. The mechanical-thermal properties of OX/ICR molded materials are therefore determined primarily by the number and mole ratio of the oxazolidinone and isocyanurate structures built into the polymer lattice. The mechanical properties of the molding materials produced according to this invention are also improved by the fact that the content of the polyether structures generated by the epoxy polymerization are increased.

Investigations of our own have shown that in the cross-linking of EP/IC resins with a formula mole ratio EP:IC of 0.2 to 0.7, the mole ratio OX:ICR of the OX and ICR rings formed in the OX/ICR molded material is distinctly less than 1; the test results given in Tables 1 and 2 below show that the mole ratio OX:ICR is usually in the range of 0.4 to 0.6. These results also show that oxazolidinone formation, in EP/IC resins with a formula mole ratio EP:IC of 0.2 to 0.7, cannot be substantially increased by use of different reaction accelerators and/or variation of the cross-linking conditions in the temperature range of 90° to 200° C. In contrast, substantially increased oxazolidinone can be achieved with the method according to this invention. It is also a particular advantage of the present invention that the mole ratio OX:ICR may not only be increased in favor of the oxazolidinone formation, but, in addition, can be controlled in a targeted manner by manipulation of various reaction parameters. These reaction parameters include the formula mole ratio EP:IC which is in the range of about 1 and 5; the type and possibly the concentration of the reaction accelerator; and the cross-linking temperature.

TABLE 1

Formation of OX— and ICR Rings in the Cross-Linking of EP/IC Resins:
Formula Mole Ratio EP:IC = 0.25 bis 0.5

| EP/IC-Resin Components | Mole Ratio EP:IC | Hardening Catalyst[1] in %[3] | | | Mole Ratio OX:ICR | Cross-Linking Conditions |
| --- | --- | --- | --- | --- | --- | --- |
| | | $BCl_3.DMBA$[1] | CE2PI | T-Base | | |
| BAGE, MDI | 0.50 | 1.0 | — | — | 0.51 | 3 h 130° C. and 16 h 200° C. |
| | 0.50 | 2.0 | — | — | 0.60 | 3 h 130° C. and 16 h 200° C. |
| NOEP, PPGE[2], MDI | 0.37 | 1.5 | — | — | 0.46 | 3 h 110° C. and 4 h 140° C. and 16 h 200° C. |
| | 0.37 | — | 1.0 | — | 0.54 | 3 h 110° C. and 4 h 140° C. and 16 h 200° C. |
| BAGE, MDI | 0.25 | 2.0 | — | — | 0.46 | 5 h 130° C. and 16 h 200° C. |
| | 0.25 | — | — | 2.5 | 0.45 | 5 h 130° C. and 16 h 200° C. |

[1]For Chemical Designation See Table 5
[2]Mole Ratio NOEP:PPGE = 1.0
[3]Catalyst concentration with Reference to Resin Matrix

TABLE 2

OX— and ICR— Ring Formation as a Function of the Catalyst Concentration in the Cross-Linking of EP/IC Resins (Mole Ratio EP:IC - 0.25 and 0.50)

| Cross-Linking Conditions | Mole Ratio BAGE[1]:MDI[1] | Hardening Catalyst $BCl_3.DMBA$[1] in %[2] | | | | | | | | |
| --- | --- | --- | --- | --- | --- | --- | --- | --- | --- | --- |
| | | Epoxy Conversion in % | | | Iscyanate Conversion in % | | | Mole Ratio OX:ICR | | |
| | | 0.5 | 1.0 | 2.0 | 0.5 | 1.0 | 2.0 | 0.5 | 1.0 | 2.0 |
| 90° C. 1 h and | 0.50 | 81 | 86 | 89 | 99 | 98 | 99 | 0.35 | 0.43 | 0.43 |
| 180° C. 6 h | 0.25 | 63 | 67 | 78 | 94 | 96 | 95 | 0.23 | 0.23 | 0.30 |
| 110° C. 30 min and | 0.50 | 73 | 77 | 87 | 98 | 99 | 100 | 0.46 | 0.51 | 0.61 |
| 180° C. 6 h | 0.25 | 66 | 74 | 77 | 95 | 93 | 94 | 0.31 | 0.37 | 0.43 |
| 130° C. 30 min and | 0.50 | 70 | 79 | 85 | 98 | 100 | 99 | 0.51 | 0.61 | 0.69 |
| 180° C. 6 h | 0.25 | 63 | 76 | 78 | 94 | 93 | 94 | 0.37 | 0.37 | 0.43 |

[1]For Chemical Designations see Table 5
[2]Catalyst concentration with reference to Resin Matrix The test results in Table 3 below show that with a combination of the above-mentioned parameters, any mole ratio OX:ICR in the range between 1 and 5 can be achieved. Further oxazolidinone formation is also possible through reaction of epoxy groups with isocyanurates in pre-cross-linked EP/IC resins which no longer contain isocyanate groups but still contain epoxy groups. The data of Table 4 below shows that this reaction proceeds appreciably at temperatures above 130° C.; and may be enhanced by increasing the epoxide concentration in the pre-cross-linked EC/IC resin.

TABLE 3

Formation of OX— and ICR— Rings in the cross linking of EP/IC Resins
Formula Mole Ratio EP:IC = 1.0 to 3.0

| Mole Ratio BAGE[1]:MDI[1] | Hardening Catalyst[1] | Mole Ratio OX:ICR | Cross-Linking Conditions |
| --- | --- | --- | --- |
| 1.0 | 2.0% $BCl_3.DBOA$ | 1.15 | 1 h 100° C., 3 h 130° C., 16 h 200° C. |
| 1.0 | 1.5% $BCl_3.DMBA$ | 1.10 | 1 h 100° C., 3 h 130° C., 16 h 200° C. |
| 1.0 | 1.0% $BF_3.1B2BI$ | 1.46 | 10 K/min up to 200° C., 16 h 200° C. |
| 1.0 | 1.0% 1CE2PI | 1.90 | 1 h 100° C., 4 h 140° C., 16 h 200° C. |
| 1.0 | 1.0% 1B2PI | 4.10 | 10 K/min up to 200° C., 16 h 180° C. |
| 2.0 | 2.0% T-Base | 2.50 | 4 h 130° C., 16 h 200° C. |
| 2.0 | 2.0% $BF_3.DMBA$ | 1.20 | 1 h 100° C., 3 h 135° C., 16 h 180° C. |
| 2.0 | 1.0% $BCl_3.DMBA$ | 1.90 | 1 h 100° C., 3 h 130° C., 16 h 200° C. |
| 2.0 | 1.0% 1,2-DMI | 4.40 | 2 h 100° C., 2 h 150° C., 16 h 200° C. |
| 3.0 | 1.5% $BCl_3.DMBA$ | 4.44 | 30 min 135° C., 16 h 200° C. |

[1]For Chemical Designations see Table 5

TABLE 4

Increase of the Mole Ratio OX:ICR in the Cross-Linking of
EP/IC Resins: Formula Mole Ratio BAGE[1]:MDI[1] = 1.0

| Cross-Linking Conditions | Catalyst 2% BCl₃.DMBA[1] | | | Catalyst 1% BCl₃.DMBA[1] | | |
| --- | --- | --- | --- | --- | --- | --- |
| | OX:ICR mole/mole | Epoxide Groups | Isocyanate Groups | OX:ICR mole/mole | Epoxide Groups | Isocyanate Groups |
| 1 h 125° C. | 0.47 | ++[2] | −[4] | 0.14 | ++ | + |
| 1 h 125° C. and 2 h 150° C. | 0.65 | +[3] | − | 1.70 | + | − |
| 1 h 125° C. and 2 h 150° C. and 16 h 200° C. | 1.25 | − | − | 2.50 | − | − |

[1]For Chemical Designations See Table 5
[2]++: Still Heavily Pronounced
[3]+: Still Present
[4]−: Completely Reacted

TABLE 5

EP/IC-Resin Components, Hardening Catalysts, Fillers

| Polyepoxide | Abbreviated Designation | Epoxide Value mole/100 g | Viscosity mPa · s |
| --- | --- | --- | --- |
| Bisphenol-A—diglycidyl ether | BAGE | 0.56–0.58 | 4000–6000 (25° C.) |
| Isomeric Bisphenol-F— diglycidyl ether | BFGE | 0.60–0.62 | 5000–7000 (25° C.) |
| Novolak-Epoxy resin | NOEP | 0.56–0.58 | 1100–1700 (52° C.) |
| Polyoxy propylene-glycol diglycidyl ether | PPGE | 0.30–0.32 | 30–60 (25° C.) |

| Polyisocyanate | Abbreviated Designation | Isocyanate Value mole/100 g | Viscosity mPa · s |
| --- | --- | --- | --- |
| Isomeric Diphenyl methane diisocyanate | MDI | 0.78–0.80 | 15 (25° C.) |
| Carbodiimide-Polyisocyanate | CDIC | 0.67–0.69 | 40 (25° C.) |
| Polyol-modified Diisocyanate | POIC | 0.59–0.61 | 140 (25° C.) |

| Hardening Catalyst | Abbreviated Designation | Note |
| --- | --- | --- |
| Boron trichloride.Dimethyl-benzylamine adduct | BCl₃.DMBA | — |
| Boron trichloride.Dimethyl-octylamine adduct | BCl₃.DMOA | — |
| Boron trifluoride.Dimethyl-benzylamine adduct | BF₃.DMBA | — |
| Boron trifluoride.1-Benzyl-2-phenylimidazole adduct | BF₃.1B2PI | — |
| Isomeric Bis(dimethylamino)-diphenylmethane | T-Base | — |
| 1,2 Dimethylimidazole | 1,2-DMI | Purified |
| 1-Cyanoethyl-2-phenylimidazole | 1CE2PI | Purified |
| 1-Benzyl-2-phenylimidazole | 1B2PI | Purified |

| Filler | Abbreviated Designation | Note |
| --- | --- | --- |
| Quartz Powder | QM I | 6400 M/cm² |
| Quartz Powder | QM II | 16900 M/cm² |

TABLE 6

Composition of EP/IC-Resin

| EP/IC-Resin | Poly-epoxide | Poly-isocyanate | EP:IC mole/mole | Hardening Catalyst | Filler |
| --- | --- | --- | --- | --- | --- |
| A | BAGE | MDI | 1.0 | 1.5% BCl₃.DMBA | 66% QM I |
| B | BAGE | MDI | 2.0 | 1.5% BCl₃.DMBA | 66% QM I |
| C | BAGE | MDI | 5.0 | 2.0% BCl₃.DMBA | 66% QM I |
| D | BAGE | MDI | 0.5 | 2.0% BCl₃.DMBA | 66% QM I |
| E | NOEP | MDI | 3.0 | 1.5% BCl₃.DMOA | 66% QM I |
| F | NOEP | MDI | 0.5 | 2.0% BCl₃.DMOA | 66% QM I |
| G | BAGE | MDI | 2.0 | 1.0% 1,2-DMI | 66% QM I |
| H | BAGE | MDI | 2.0 | 1.5% BF₃.1B2PI | 66% QM I |
| I | BFGE | CDIC | 1.0 | 1.0% 1CE2PI | 66% QM II |
| K | BFGE | POIC | 1.0 | 1.0% 1CE2PI | 66% QM II |

The improvement of the mechanical properties of the highly heat resistant OX/ICR molded materials produced by the method according to the invention, having a mole ratio OX:ICR larger than 1 can be seen from Table 7. A comparison of the data in Table 7 below shows that OX/ICR molded materials which were produced from EP/IC resins A and B having a formula mole ratio EP:IC equal to or greater than 1 have a distinctly higher mole ratio OX:ICR compared to molded materials of EP/IC resins with an EP:IC ratio of 0.5, e.g. resin D, and that this results in considerably improved mechanical property values. These data also show that, in spite of increased concentration of the hardening catalyst, the epoxy conversion is only about 80% with the EP/IC resin D. While the values for the dimensional heat resistance are somewhat lower for the EP/IC resins A and B than for D, the OX/ICR molded materials with glass transition temperatures of more than 200° C. still have excellent dimensional heat resistance. The data for the EP/IC resin C, however, shows that no OX/ICR molded materials which can be considered as highly dimensionally heat stable can be expected with resins having a formula mole ratio EP:IC larger than 5. A comparison of the values for OX/ICR molded material from the EP/IC resins E and F gives results analogous to that of the comparison of molded material from the resins A and B with D. The values for the EP/IC resin E also show that the dimensional heat stability of the OX/ICR molded materials can be increased further while maintaining good mechanical properties, through the choice of special polyepoxy components in the EP/IC resin. It is of special importance for the industrial application of the EP/IC resins that the mole ratio OX:ICR can be targeted (selected), and thereby the mechanical/thermal properties of the molded material, can be applied easily in existing manufacturing processes without additional measures.

TABLE 7

OX/ICR-Molded Materials:
Properties Mole Ratio OX:ICR, Epoxy Reaction

| EP/IC-Resin | | OX/ICR-Molded Material | | | |
|---|---|---|---|---|---|
| Designation[1] | EP:IC mol/mol | MT[2] °C. | BF[2] N/mm² | SZ[2] Nmm/mm² | OX:ICR mol/mol | Epoxy Reaction[3] % |
| A | 1.0 | 205 | 106 | 9.5 | 1.05 | 93 |
| B | 2.0 | 180 | 116 | 11 | 1.90 | 96 |
| C | 5.0 | 145 | 125 | 15.5 | 5.71 | 100 |
| D | 0.5 | 225 | 76 | 4 | 0.51 | 80 |
| E | 3.0 | 210 | 105 | 9.5 | 2.34 | 95 |
| F | 0.5 | 235 | 71 | 3.5 | 0.42 | 76 |
| G | 2.0 | 160 | 135 | 17 | 4.40 | 100 |
| H | 2.0 | 180 | 120 | 12 | 1.50 | 100 |
| I | 1.0 | 195 | 145 | 15 | 1.70 | 100 |
| K | 1.0 | 155 | 163 | 20 | 4.70 | 100 |

[1]For Chemical Designations and Compositions of the EP/IC-Resins See Tables 5 and 6
[2]MT = Dimensional heat resistance in accordance with Martens
BF = Bending strength
SZ = Impact strength
[3]Isocyanate reaction 100%

It was unforeseeable that the formation of oxazolidinone, and thereby the mechanical properties of the OX/ICR molded materials, could be controlled and improved in such a targeted manner with a formula mole ratio EP:IC larger than 1 as opposed to a mole ratio EP:IC smaller than 1. It was also surprising that the basically known reaction of the oxazolidinone formation from isocyanurates and epoxides proceeds so unambigously in already highly cross linked EP/IC resins with glass transition temperatures higher than 150° C. However, it is also found that the formula mole ratio EP:IC can be used only in a limited range, namely, between about 1 and 5 for preparing OX/ICR molded materials with outstanding overall physical properties. A further increase of the epoxy content in the formula mole ratio EP:IC to values larger than about 5 is of only small importance to the industrial application of OX/ICR molded materials because the glass transition temperatures of the molded material drop distinctly and the mechanical properties are no longer improved substantially. Molded materials with these mechanical-thermal properties can also be obtained with conventional acid anhydride-cross-linked epoxy resins.

U.S. Pat. No. 4,220,731, teaches a method for the manufacture of cross-linked polymers which involves liquid epoxy compounds, containing at least two epoxy groups in the molecule, with polyisocyanates, and optionally, polyhydroxyl compounds, in the presence of hardening catalysts at temperatures between room temperature and 250° C. In this method, the mass ratios can be chosen so that in the starting reaction mixture, 0.1 to 2 isocyanate groups fall to one epoxy group, preferably, 0.3 to 1.2 isocyanate groups. However, in this method, acid hardening catalysts are used exclusively because the use of a complex compound of $BF_3$ with an ether, a phosphonium compound or water, possibly together with a Sn, Zn or Fe compound, as the hardening catalyst, are required. In contrast thereto, basic catalysts are used exclusively in the method according to the present invention.

In U.S. Pat No. 4,220,731, no further reference to the combination of features essential in the method according to the present invention can be found, particularly, the EP/IC ratio (in the reaction resin) the hardening catalyst, the cross-linking temperature, and more importantly, to the OX:ICR ratio which is essential in the molded materials produced.

The explanations above also apply with respect to U.S. Pat. No. 4,056,579 which teaches a heat-hardening resin composition which comprises substantially the following components:

(a) a condensation product which contains isocyanate end groups and which is obtained by reaction of a polycarboxylic acid compound having at least one acid anhydride ring with a stochiometric excess of a polyfunctional isocyanate compound, or the condensation product which containes an unreacted isocyanate compound, (b) a polyfunctional epoxy compound, (c) a catalyst which leads mainly to the formation of isocyanurate and oxazolidinone rings, as well as, optionally (d) additives such as pigments, fillers, etc.

In this connection, the condensation product containing isocyanate end groups, or the condensation product containing unreacted isocyanate compound, can be present in a ratio of isocyanate groups to poly-functional epoxy compound of 0.2:1 to 4:1.

The isocyanate compounds present in the resin compositions, known from U.S. Pat. No. 4,056,579, are not only expensive and difficult to prepare; they also can scarcely be used in the molding process because they have a very high viscosity. The known resin compositions, therefore, have limited value for practical use as casting and impregnating resins. A further disadvantage of these resins is their relatively high gelling temperature. In contrast thereto, the reaction resin mixtures prepared in accordance with the present invention have a low viscosity and are therefore readily usable as casting and impregnating resins, and specifically without the use of solvents.

British Pat. No. 1,321,914 and U.S. Pat. No. 3,767,624, teach an oxazolidinone-modified epoxy novolak resin which is obtained by reaction of (a) an epoxy novolak resin and (b) an organic diisocyanate or diisothiocyanate, optionally in the presence of a monovalent alcohol, or a carbamate of an organic diisocyanate and a monovalent alcohol, in the presence of catalyst, where the ratio of NCO or NCS groups to epoxy groups is kept in the range of 0.1:1 to 0.5:1. However, these references involve the manufacture of resins, i.e., soluble compounds, not the manufacture of molded materials. These resins are modified epoxy compounds which are hardened in a manner know per se, i.e., pure epoxy resin hardening takes place, but no reaction with isocyanate.

Examples of for the polyepoxides used in the method according to the invention are, relatively low-viscosity, aliphatic, cycloaliphatic or aromatic epoxides as well as mixtures thereof, and preferably, bisphenol-A-diglycidyl ether; bisphenol-F-diglycidyl ether; 3,4-epoxy cyclohexylmethyl-3',4'-epoxy cyclohexane-carboxylate; polyglycidyl ether of phenol/formaldehyde or cresol/formaldehyde novolak; diglycidyl esters of phthalic, isophthalic or terephthalic acid; and mixtures of these epoxy resins. Other usable polyepoxides include, hydrogenated bisphenol-A- or bisphenol-F-diglycidyl ether; hydantoin epoxy resins; triglycidylisocyanurate; triglycidyl-p-aminophenol; tetraglycidyldiaminodiphenylmethane; tetraglycidyldiaminodiphenyl ether; tetrakis(4-glycidoxyphenyl)-ethane; urazolepoxides and epoxides which are described in "Handbook of Epoxy Resins" by Henry Lee and Kris Neville, McGraw-Hill Book Company, 1967, and in the monograph of Henry Lee "Epoxy Resins", American Chemical Society, 1970.

Polyisocyanates useful in the method according to this invention include low-viscosity aliphatic, cycloaliphatic or aromatic isocyanates and mixtures thereof preferably, isomer mixtures of 4,4'- and 2,4'-diphenylmethanediisocyanates; polyol-modified polyisocyanates and mixtures of liquid polyisocyanates with higher-molecular polyisocyanates or carbodiimide polyisocyanates other usable polyisocyanates include hexane 1,6-diisocyanate; cyclohexane-1,3-diisocyanate and its isomers; 4,4'-dicyclohexylmethane-diisocyanate; 3-isocyanatomethyl-3,5,5-trimethylcyclohexylisocyanate; 1,3-dimethylbenzene W,W'-diisocyanate and its isomers; 1-methylbenzene-2 4-diisocyanate and its isomers; naphthalene-1,4-diisocyanate, diphenyl ether-4,4'-diisocyanate and its isomers; diphenylsulfone-4,4'-diisocyanate and its isomers; as well as, tri- or higher-functional isocyanates such as, for instance, 3,3',4,4'-diphenylmethanetetraisocyanate. Also isocyanates which are masked in the usual manner with phenol or cresol can be used. Dimers and trimers of the above-mentioned multivalent isocyanates can also be used. Such polyisocyanates have end-position free isocyanate groups and contain one or more uretdione and/or isocyanurate rings. Methods for preparing different types of such trimers and uretdiones are described, for instance, in U.S. Pat. Nos. 3,494,888; 3,108,100 and 2,977,370 the texts of which are incorporated herein by reference.

The EP/IC resins may also contain components which do not participate in the chemical reactions which lead to the OX/ICR molded material. For example, mineral and fibrous materials, e.g., quartz powder, fused silica, aluminum oxide, glass powder, mica, kaolin, dolomite, graphite and carbon black as well as carbon fibers, glass fibers and textile fibers are contemplated filler materials. Pigments, stabilizers and adhesion agents, as well as, other additives of the customary types can likewise be added to the EP/IC resins.

In the method according to the present invention, the catalyst promoting the OX- and ICR-ring formation during cross-linking plays an important role. The contemplated catalysts include tertiary amines and imidazoles. Preferable tertiary amines include tetramethylethylene diamine; dimethyloctylamine; dimethyl-amino ethanol; dimethylbenzylamine; 2,4,6-tris(dimethylamino methyl)phenol; N,N'-tetramethyldiamino-diphenyl methane; N,N'-dimethylpiperazine; N-methylmorpholine; N-methylpiperidine; N-ethylpyrrolidine; 1,4-diazabicyclo(2,2,2)octane and quinolines. Preferable imidazoles include 1-methylimidazole; 2-methylimidazole; 1,2-dimethylimidazole; 1,2,4,5 tetramethylimidazole; 1-benzyl-2-phenylimidazole; 2-undecylimidazole; 2-heptadecylimidazole; 2-ethyl-4-methylimidazole; 1-cyanoethyl-2-ethyl-4-methylimidazole; 1-cyanoethyl-2-phenylimidazole and 1-(4,6-diamino-s-triazinyl-2-ethyl)-2-phenylimidazole.

However, the mentioned hardening catalysts react at low temperatures and thus lead to relatively short pot times, which can make the processing of the EP/IC resins more difficult. In the method according to the invention, latent hardening catalysts may therefore be used advantageously to assure sufficient use (pot) time at low temperatures. These latent hardening catalysts, which are also called latent reaction accelerators, include addition complexes of boron trihalogenides with tertiary amines and imidazoles, for instance, the addition complexes described in U.S. Pat. No. 4,131,600 of boron trichloride and tertiary amines of the general formula $BCl_3 \cdot NR^1R^2R^3$, in which $R^1, R^2$ and $R^3$ are the same or different aliphatic, aromatic, heterocyclic or arylaliphatic radicals which may also be parts of heterocyclic rings in pairs and the analogous complexes of boron trifluoride of the formula $BF_3 \cdot NR^1R^2R^3$, where $R^1, R^2$ and $R^3$ have the meaning given above. Specific examples of useful tertiary amines of the $BF_3$ and $BCl_3$ complexes (adducts) are octyldimethylamine and benzyldimethylamine. Also morpholine compounds and imidazoles, especially N-methylmorpholine; N-ethylmorpholine; 1,2-dimethylimidazole and 1-benzyl-2-phenylimidazole are suitable for $BCl_3$ and $BF_3$ complexes, respectively.

An extension of the pot (use) time of the EP/IC resins used in the method according to the invention can also be obtained if tertiary amines or imidazoles which are deactivated by the addition of electron acceptors are used as latent catalysts. Exemplary electron acceptors are, for instance; 7,7,8,8-tetracyanoquinodimethane; 2,4-dichloro-5,6-dicyanobenzoquinone; 2,3,5,6-tetrachlorobenzoquinone and 1,2-dinitrobenzol as well as isomers thereof.

Hardening catalysts for the EP/IC resins also include suitable onium salts of tertiary amines and imidazoles, i.e., onium salts with N as the central atom. Examples for usable onium salts are; tetraethylammonium chloride; tetraethylammonium bromide; octyltrimethylammonium bromide; benzyltrimethylammonium chloride; N-ethylmorpholinium bromide; 2-ethyl-4-methylimidazolium bromide; N-ethylmorpholiniumtetraphenyl borate; 1,2-dimethylimidzolium tetraphenyl borate and tetrabutylammoniumtetraphenyl borate.

The EP/IC resin content of hardening catalyst is advantageously 0.01 to 5% by weight and preferably 0.25 to 2.5% by weight, with reference to the mass of the resin matrix. By the type and the concentration of the hardening catalyst, the hardening temperature and the hardening time can be adjusted.

The OX/ICR molded materials produced by the method according to the invention are particulary well suited for impregnating an embedding electrical windings or for the casting-in and encapsulation of electrical and electronic components.

The invention will be explained in further detail with the aid of the embodiment examples. The composition of the EP/IC resins used in the following examples can be taken here from Tables 5 and 6 above.

EXAMPLES 1 TO 3

(A B and C Resin Preparation and Testing)

The EP/IC resins A, B and C were prepared as follows: the individual components BAGE, MDI and QM I were stirred successively into a mixing vessel preheated to 80° C. and degassed for 1 hour at 80° C. while stirring and at a reduced pressure (below 1 mbar). Subsequently, the EP/IC resins were cooled down to 60° C.; the hardening catalyst was added, and the EP/IC resins were degassed once more for 1 hour at 60° C. while stirring and at a reduced pressure. Thereupon, the EP/IC resins were poured at reduced pressure in standard rod molds preheated to 100° C. The cross-linking (hardening) of the EP/IC resins took place for 1 hour at 100° C., then for 3 hours at 125° C. and then for 16 hours at 200° C. The physical properties of the OX/ICR molded material produced in this manner, i.e., the bending strength (BF) according to DIN 53 452, the impact strength (SZ) according to DIN 53 453, and the dimensional heat resistance according to Martens (MT) and DIN 43 458, were measured. The mole ratio OX:ICR was determined by infrared spectroscopy and the percent of the epoxy and isocyanate group content by chemical analysis. The values obtained are summarized in Table 7.

EXAMPLE 4

(D Resin Preparation and Testing)

The preparation of the EP/IC resin D; the fabrication of the standard rod molded material samples, and sample testing were carried out as in Example 1. The measured values are presented in Table 7.

EXAMPLE 5

(E Resin Preparation and Testing)

The preparation of the EP/IC resin E, the fabrication of the standard rod molded material samples, and sample testing were carried out as in Example 1; except that the resin was poured into standard rod molds preheated to 125° C. and then cross-linked and hardened for 1 hour at 125° and 16 hours at 200° C. The measured values are presented in Table 7.

EXAMPLE 6

(F Resin Preparation and Testing)

The preparation of the EP/IC resin F, the fabrication of the standard rod molded material samples, and sample testing, were carried out as in Example 5. The measured values are presented in Table 7.

EXAMPLE 7

(G Resin Preparation and Testing)

The preparation of the EP/IC resin G, the fabrication of the standard rod molded material samples, and sample testing, were carried out as in Example 1; except that the resin was cooled down to 40° C. before the hardening catalyst was added. The EP/IC resin was then degassed for 10 minutes at 40° C. and reduced pressure while stirring and was, subsequently, poured into standard rod molds preheated to 80° C. The cross-linking (hardening) of the EP/IC resin G took place for 2 hours at 80° C., then for 2 hours at 100° C., then for 2 hours at 150° C. and then for 16 hours at 180° C. The measured values are presented in Table 7.

EXAMPLE 8

(H Resin Preparation and Testing)

The preparation of the EP/IC resin H, the fabrication of the standard rod molded material samples, and sample testing, were carried out as in Example 1. The measured values are presented in Table 7.

EXAMPLES 9 AND 10

(I and K Resin Preparation and Testing)

The preparation of the EP/IC resins I and K, the fabrication of the standard rod molded material samples, and sample testing were carried out as in Example 1; except for the addition of the hardening catalyst whereby the EP/IC resins were cooled down to 50° C.; subsequently they were degassed for 20 minutes at 50° C. while stirring and at reduced pressure and then poured into standard rod molds preheated to 100° C. and subsequently hardened for 4 hours at 130° C. and, thereafter, for 16 hours at 200° C. The measured values are presented in Table 7.

What is claimed is:

1. A method for preparing reaction resin molded materials containing oxazolidinone and isocyanurate rings, which comprises:
   mixing a polyepoxide and a polyisocyanate to form a resin mixture having a viscosity up to about 7000 mPa sec at 25° C. wherein the mole ratio of epoxy to isocyanate groups is in the range of about 1:1 to 5:1, said resin mixture being free of triallyl cyanurate;
   reacting the resin mixture in the presence of a catalyst selected from the group consisting of an imidazole and a tertiary amine, under the conditions of elevated gelling temperatures of from about 80° C. to about 130° C. to form a cross-linked polymer;
   heating the cross-linked polymer to about 130° to about 200° C. to cause post-hardening and produce a molded material;
   the molded material having a mole ratio of oxazolidinone to isocyanurate rings greater than about 1 and the reaction of epoxy and isocyanate groups being greater than about 90% after hardening.
2. The method recited in claim 1, wherein:
   the mole ratio of oxazolidinone to isocyanurate rings is in the range of about 1:1 and 5:1.
3. The method recited in claim 2, wherein:
   a latent hardening catalyst is added to the reaction resin mixture.
4. The method recited in claim 1, wherein:
   the hardening catalyst is a latent hardening catalyst.
5. The method recited in claim 4, wherein:
   the hardening catalyst is a boron trihalogenide having an adduct selected from the group consisting of a tertiary amine and an imidazole.
6. The method recited in claim 5, wherein:
   the hardening catalyst is selected from the group consisting of boron trichloride dimethylbenzylamine adduct and boron trifluoride 1-benzyl-2-phenylimidazole adduct.
7. The method recited in claim 5, wherein:
   the hardening catalyst is selected from the group consisting of a tertiary amine or an imidazole deactivated with an electron acceptor.
8. The method recited in claim 7 wherein:
   the electron acceptor is 7,7,8,8-tetracyanoquinodimethane.
9. The method recited in claim 4, wherein:
   the hardening catalyst is selected from the group consisting of onium salts of tertiary amines and imidazoles.
10. The method recited in claim 9 wherein:
    the hardening catalyst is selected from the group consisting of benzyltrimethylammonium chloride and 1,2-dimethylimidazolium tetraphenyl borate.
11. The method recited in claim 1, wherein:
    the hardening catalyst concentration is in the range of about 0.01 to 5% by weight.
12. The method recited in claim 11, wherein:
    the hardening catalyst concentration is in the range of about 0.25 to 2.5% by weight.
13. The method recited in claim 1, wherein:
    a mineral or fibrous filler is added to the reaction resin mixture.
14. The method recited in claim 13, wherein:
    the filler is selected from the group consisting of quartz powder, fused silica, aluminum oxide and dolomite.
15. A method for insulating an electrical device, which comprises:
    covering at least a portion of the device surface with a molded material prepared in accordance with claim 1.

* * * * *